United States Patent
Auger et al.

(10) Patent No.: US 7,655,880 B2
(45) Date of Patent: Feb. 2, 2010

(54) METHOD FOR MONITORING A RESISTANCE WELDING PROCESS AND DEVICE THEREFOR

(75) Inventors: Patrice Auger, Beynes (FR); Jacky Soigneux, Clamart (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 163 days.

(21) Appl. No.: 11/571,264

(22) PCT Filed: Jun. 27, 2005

(86) PCT No.: PCT/FR2005/050504

§ 371 (c)(1),
(2), (4) Date: Dec. 22, 2006

(87) PCT Pub. No.: WO2006/003347

PCT Pub. Date: Jan. 12, 2006

(65) Prior Publication Data

US 2007/0175869 A1    Aug. 2, 2007

(30) Foreign Application Priority Data

Jun. 28, 2004  (FR) .................................. 04 07056

(51) Int. Cl.
*B23K 11/24*  (2006.01)
*B23K 11/00*  (2006.01)

(52) U.S. Cl. ...................... 219/110; 219/55; 219/76.17; 219/78.01

(58) Field of Classification Search ................. 219/110, 219/55, 76.17, 78.01
See application file for complete search history.

(56) References Cited

U.S. PATENT DOCUMENTS 6,506,997 B2 * 1/2003 Matsuyama ................. 219/110
7,127,438 B2 * 10/2006 Monari ........................ 706/21

FOREIGN PATENT DOCUMENTS

| FR | 2631866 A | 12/1989 |
| FR | 2803785 A | 7/2001 |
| JP | 04121307 A * | 4/1992 |

* cited by examiner

*Primary Examiner*—Tu B Hoang
*Assistant Examiner*—Ayub Maye
(74) *Attorney, Agent, or Firm*—Nicolas E. Seckel

(57) ABSTRACT

A method for monitoring a resistance welding process carried out on a stack of metal workpieces (1) clamped between two electrodes (2a, 2b) of a clamp (3), and a device therefor. According to the method, the electrodes (2a, 2b) are subjected to a clamping force (F) and a voltage (V(t)) enabling a current (I(t)) to flow through the stack of metal workpieces (1). The monitoring method further includes at least one step of analysing the clamping force (F) by comparison with a model from a prior learning process. The result of the analysis of each step is taken into account by a decision-making matrix to generate a correction and/or control signal intended for the welding process.

6 Claims, 1 Drawing Sheet

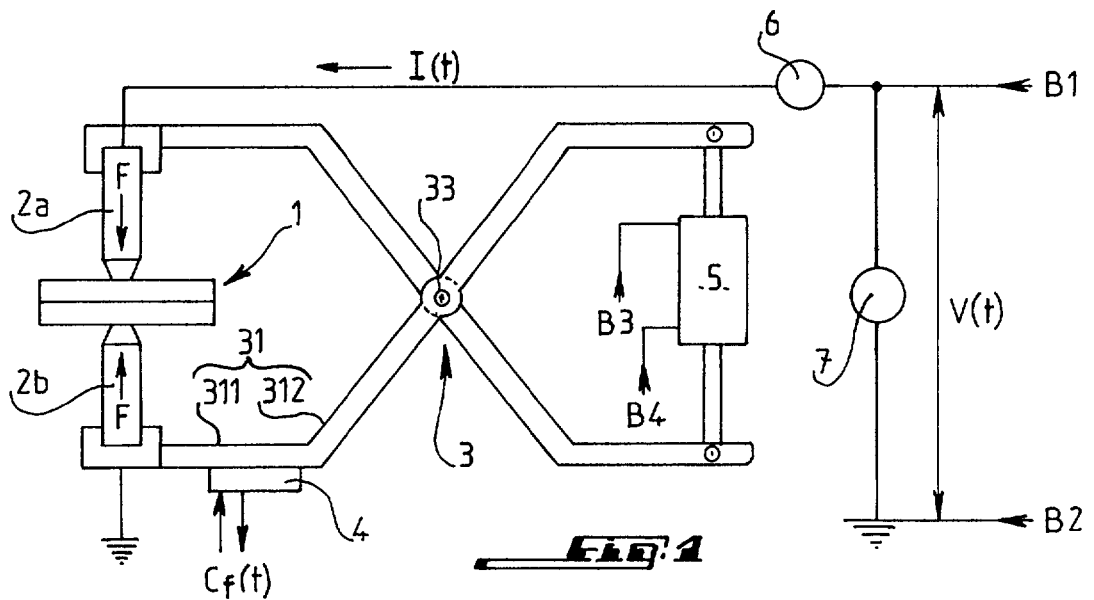
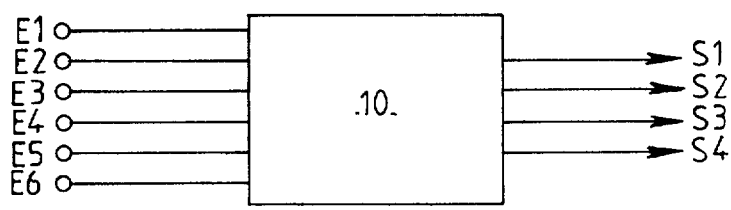
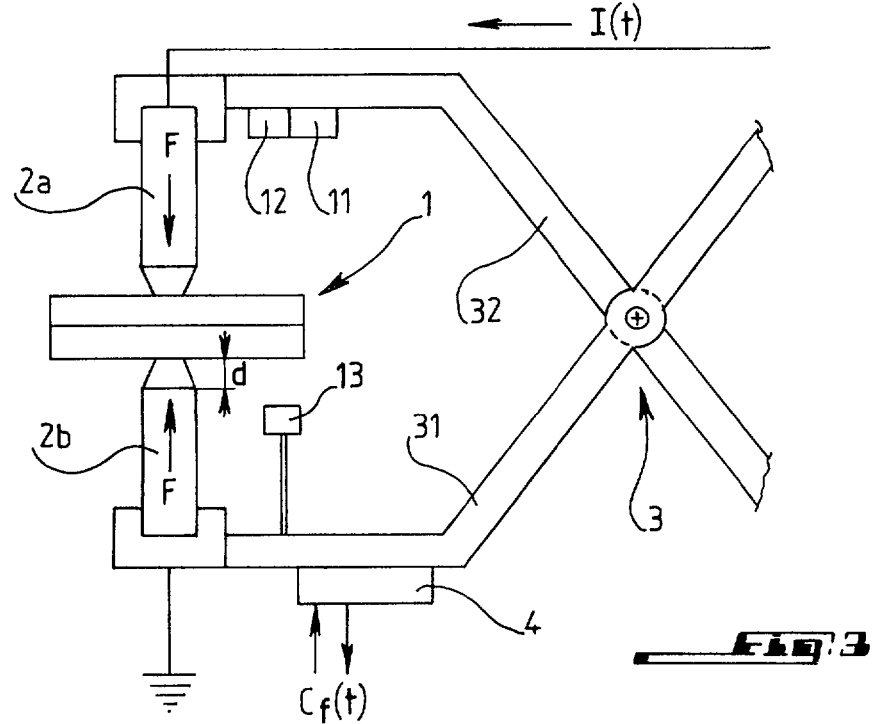

METHOD FOR MONITORING A RESISTANCE WELDING PROCESS AND DEVICE THEREFOR

The invention concerns a method for monitoring a resistance welding process of a stack of metallic parts, as well as a monitoring device for implementing such a monitoring method.

Resistance welding of a stack of metallic parts in general, and resistance welding with two electrodes and resulting in welding spots in particular, belong to the standard welding methods and have already been used for some time. These methods operate according to the principle that at least one heating electrode is used, which is contacted with the stack of parts to be welded, a force is applied by the electrode on the parts to be welded, and an electric current is passed through this electrode, the electric current then passing through the parts to be welded. Depending on the type of welding selected, a mobile electrode is used, which is applied to the parts to be welded, the other electrode being then constituted by the one among the metallic parts which is the farthest from the mobile electrode. According to another type of welding, two mobile electrodes are used, a force is applied by the electrodes to the parts to be welded in order to clamp them between the electrodes, and the current is passed through the parts to be welded.

The present invention concerns more particularly spot welding, but it has certain characteristics also applicable to resistance seam welding or other means enabling continuous welding, as opposed to spot-welding.

Spot-welding apparatuses are in general designed so as to apply the clamping force with the electrodes of a clamp according to a cycle during which this force is increased, then reduced, and is followed by a welding cycle during which the electric current is applied, either continuously or by impulsions.

Such a spot-welding method requires that, for each type of parts to be welded, it must be determined, essentially as a function of the nature and of the thickness of the parts to be welded, how certain welding parameters must evolve as a function of time to obtain a minimal welding time. Subsequently, the welding apparatus is adjusted as a function of the determined parameters.

This manner of operating results in that the time required to perform a welding spot is always the same for a given type of part. However, in large mass productions, as is the case in the automobile industry, there may be several thousands welding spots on a same vehicle. Thus, there is a certain interest in finding a means for reducing the time required for each of these welding spots without endangering the welding quality.

In the document FR-A-2 631 866, a method is described which makes it possible to optimize the duration of each welding operation and to reduce as much as possible this duration in order to increase the productivity. This optimization method is based on a measurement of the clamping force applied to the parts to be welded. According to this method, threshold values of said clamping force are established through preliminary tests as a function of the type of parts to be welded, and certain welding operations are controlled when the measured force crosses the corresponding threshold values.

More particularly, a first threshold value is established during the force increase phase and the electric current is passed in the electrodes when the measured force goes above this first threshold value. A second threshold value, indicative of a satisfactory welding quality, is also established, and it is monitored, during the passage of the current, whether the clamping force crosses this second threshold value. And finally, a third threshold value is established during the force reduction phase, in which it can be ordered to move the welding robot so that the movement takes place as soon as possible after opening of the electrodes. This movement order will be given when the measured force crosses the third threshold value.

In spite of the interest of this technique for monitoring resistance welding, it has been noticed, in some cases, that the obtained welding spots were of mediocre quality, even though the clamping force had experienced a relatively important evolution toward an increase during the welding step.

As a remedy thereto, an operation described in the document FR-A-2 802 785 will be introduced. This monitoring and correcting operation consists in comparing to at least one additional threshold an evolution toward a decrease of a force parameter representative of the clamping force, this force parameter being measured at least during the passage of the current. When the decreasing evolution goes over this additional threshold in amplitude, the monitoring device signals an anomaly.

In general, an additional step is included in this monitoring method, which consists in measuring a maximal value reached by the force parameter during the passage of the current, in measuring an instantaneous value of the force parameter at the end of a predetermined constant time period following an interruption of the current but concomitant to the application of the clamping force, and in comparing to a predetermined interval the difference between the maximal value and the instantaneous value. When the difference is outside the predetermined interval, the monitoring device signals an anomaly.

The two methods for improving and monitoring a resistance welding method found their analysis and their correction of the welding method only on the observation of the clamping force applied by the electrodes to the parts to be welded.

However, it has been observed that a diagnostic relying on the comparison of a signal representative of the clamping force of the electrodes to pre-established thresholds allows only a rough test of the quality of the performed welding spot.

Indeed, this diagnostic presumes that all the elements intervening in resistance welding operation have constant characteristic, at least during the performance of a succession of spot-welding operation, and that the clamping force would thus be the only parameter that varies and needs to be monitored. Thus, this diagnostic as practiced until now does not take into account a possible jamming of the closure mechanism of the clamp and the consequences that this jamming might have on the clamping force and the force parameter which represents it. This diagnostic does not take into account either the influence of the surface state and of the geometry of the welding tips or of the welding electrodes, nor of the behavior of the welding spot during its cooling. Finally, such a diagnostic does not take into account either specific characteristics of welding spots to be performed. Indeed, the characteristics of the welding spots to be performed also depend on characteristics such as the nature of the parts to be welded, their number, and their thicknesses, as well as the current intensity and the number of current periods applied.

The objective of the invention is to improve the monitoring of the resistance welding of a stack of metallic parts clamped between two electrodes of a clamp, and in particular, to improve the diagnostic of the resistance welding in order to optimize the welding operation and to improve the quality of the obtained welding spots.

The objective of the invention is reached on the basis of the following thoughts.

The metallic parts intended to be assembled by a resistance welding method, here in particular by spot-welding, are sheets having a more or less large thickness obtained by lamination. Consequently, even if it is assumed that the metal itself is homogeneous, each sheet exhibits thickness variations within predetermined tolerances depending on the desired quality.

These thickness variations result in that the electric resistance measured in the direction of the sheet thickness is not constant within a same metallic part. When the task is to assemble two or more metallic parts, these variations can either compensate for each other or add to each other and result in relatively large variations of the electric resistance of the stack of metallic parts to be welded.

Another source of instability of the electric welding current has its origin in fluctuations, as minimal as they may be, of the thermal conductivity of the sheets to be assembled. Since the thermal conductivity of a metal goes generally together with its electric conductivity, the above thoughts on the electric resistance of the stack of metallic parts to be welded can apply in an analogous manner to the evaluation of the possible fluctuations of the thermal conductivity of a stack of metallic parts to be welded.

It is reminded in this context that the resistance welding method is a process requiring a localized heating of the parts to be assembled, this localized heating being obtained by Joule effect which occurs in any resistant metallic part through which an electric current passes.

Fluctuations in the thermal resistance then produce fluctuations in the flow of the thermal energy generated during the welding operation, and cause in this manner, secondarily, possible additional fluctuations of the electric resistance of the metallic parts, with consequences on the welding current, as well as influences on the cooling of the welding spots after the welding current has stopped.

The other element intervening in the welding method is constituted by the electrodes themselves. Since the welding current passing through the stack of metallic parts to be welded comes from one of the two electrodes between which the stack of metallic parts is clamped, geometric characteristics such as the diameter of the contact surface of the electrodes on the stack of metallic parts and the surface state of the electrodes, in particular that of the contact face, have a direct influence on the welding quality. Indeed, since the tips of the electrodes have generally a frusto-conical shape, the contact surface increases along with the wearing off of the electrodes. To obtain the same pressure on the stack of metallic parts, it is thus necessary to increase the clamping force gradually along with the wear-out of the electrodes. Simultaneously, it is necessary to increase also the intensity of the welding current to maintain the surface intensity of the current constant.

In a manner comparable to the influences of the surface states of the stack of metallic parts, the surface state of the electrodes has an influence on the welding current.

Further, the diameter of the contact surface of each of the two electrodes is very important, for purely mechanical considerations. Indeed, if the diameter of the selected electrodes is too small, this results in a heavy and undesirable marking on the stack of metallic parts. In an extreme situation, one at least of the two electrodes can penetrate into the corresponding metallic part in the manner of a punch and thus prepare a possible wrenching of one of the assembled metallic parts by leaving the core of the welding spot on the metallic part unpunched whereas a hole occurs on the punched part.

Finally, without being limitative regarding the characteristics of a welding spot formed by implementing a resistance welding method, the dimensions of each of the obtained welding spots, in particular the upper diameter and the lower diameter of each welding spot, as well as the possible presence of splatter spots, i.e., melted materials projected beyond the limits of each welding spot, phenomenon that reduces the mechanical resistance of the stack of welded metallic parts, constitute criteria that deserve monitoring during the welding method to deduct therefrom correction signals that can be applied to the welding apparatus, in particular, by varying the welding current and the clamping force applied to the stack of metallic parts to be welded.

Based on the thoughts above, the objective of the invention is reached by a method for monitoring a resistance welding method of a stack of metallic parts clamped between two electrodes of a clamp, comprising applying to the electrodes, on the one hand, a clamping force, and on the other hand, an electric tension making it possible to pass a current through the stack of metallic parts, the welding method comprising at least a step of measuring a force parameter representative of the clamping force before, during, and after, respectively, passage of the current, and the monitoring method comprising at least one step of establishing threshold values of said clamping force and at least one step of comparing the force parameter to at least two different threshold values to deduct therefrom an evolution of the force parameter and to control certain welding operations as a function of the aspect or of the evolution of said clamping force parameter.

According to the invention, the monitoring method comprises further at least one step of analyzing the clamping force with respect to a model resulting from a preliminary learning phase, the analysis result of each step being taken into account by a decision-making matrix making it possible to generate a correction and/or control signal intended for the welding method.

This solution proposed by the present invention is based on the fact that the monitoring and the adjustment of the clamping force applied by the electrodes to the stack of metallic parts to be welded remains the most important characteristics to obtain a good quality welding.

Indeed, the clamping force must be large enough to maintain securely the metallic parts to be welded in contact at the location where the welding stop must be performed. Simultaneously, the contact between the electrodes and the stack of metallic parts must be sufficiently secure to ensure the best passage of welding current possible. Conversely, the clamping force must not be too large to avoid that one or both of the two electrodes penetrate into the stack of metallic parts, leaving behind them, after welding, an imprint likely to constitute a starting point for wrenching by punching. In addition, the clamping force must be adjusted as a function of the temporary volumic increase in the stack of metallic parts at the location where the welding spot must be performed.

It is thus appropriate, according to the invention, to detect the maximum of things solely by the analysis of the clamping force curve.

The measurement of the clamping force and the deduction of a force parameter representative of this clamping force are advantageously performed with a device comprising a detector of mechanical constraints such as, for example, a piezoelectric cell. This piezoelectric cell can be disposed close to the electrodes or between the electrodes and the arms of the clamp carrying these electrodes. The constraint detector can also be a deformation detector positioned on one or the other of the clamp arms.

Using a mechanical constraint detector makes it possible to monitor the behavior of the arms of the clamp in a dynamic manner, i.e., not limited to distinct instants at which a few constraints threshold have been preliminarily measured. Thus, the behavior of the arms is monitored continuously and in particular as a function of the evolution of the characteristic to be monitored.

Advantageously, the monitoring method according to the invention comprises further one or several step of analyzing at least one additional characteristic with respect to a corresponding model resulting from a preliminary learning phase, the one or several additional characteristics being selected among the volumic expansion of a welding spot, the increase in the clamping force during the temperature increase of a welding spot, the stabilization of the clamping force after temperature increase of the welding spot, the behavior of the current passing through the stack of metallic parts to be welded, the cooling of the welding spot after the current passing through the stack of metallic parts has stopped, the diameter of a welding spot, the detection of melted material projected outside of the perimeter of a welding spot.

Other technical characteristics of the welding method which are advantageously monitored by the monitoring method according to the invention can include any one or several of the following steps:

a step of detecting the jamming of the clamp mechanism;

a step of monitoring the honing of the electrodes by checking the drop of the force of application of the electrodes during the honing;

applying the welding current in the form of impulses, each impulse being then controlled individually as a function of the result of the corresponding step.

The objective of the invention is also reached by a monitoring device for implementing the method described above. Such a device comprises adapted measurement means for measuring a force parameter representative of the clamping force of the electrodes of a clamp of an apparatus for resistance welding of a stack of metallic parts clamped between the electrodes before, during, and after, respectively, the passage of a current, adapted determination means for establishing threshold values of said clamping force and adapted comparison means for comparing the force parameter to at least two different threshold values to deduct therefrom an evolution of the force parameter and to control certain welding operations as a function of the evolution of said clamping force parameter.

According to the invention, the device comprises means for analyzing the clamping force with respect to a model resulting from a preliminary learning phase, the analysis result of each step being taken into account by a decision-making matrix connected to means for forming and sending a correction and/or control signal intended for the welding apparatus.

The monitoring device according to the invention comprises thus different means selected as a function of the technical characteristics to be monitored and as a function of the correction controls to be given to the means controlling the clamping force and the welding current applied to the electrodes of the welding clamp.

In the framework of the present invention, the welding clamp includes all the means necessary for supporting, supplying, and manipulating electrically and mechanically the welding clamp, the whole forming a welding apparatus.

Thus, the device of the invention comprises, in addition to the means for analyzing the clamping force, one or more means adapted for measuring one or the other of the additional characteristics selected among the volumic expansion of a welding spot, the increase in the clamping effort during the temperature increase of a welding spot, the stabilization of the clamping force after temperature increase of the welding spot, the behavior of the current passing through the stack of metallic parts to be welded, the cooling of a welding spot after the current passing through the stack of metallic parts has stopped, the detection of melted materials projected outside of a welding spot.

It goes without saying that the means with which the monitoring device is equipped can be installed in one or two units, depending on whether it is desired to perform the measurements on only one of the two arms of the clamp or simultaneously on each of the arms of the clamp. When two means adapted to measure a same additional characteristics are used, these two units can be used, as a variant embodiment of the present invention, either in redundancy, thus preventing an accidental defect in the operation of the means, or to measure the same characteristics twice and to deduct therefrom an average value, thus making it possible to compensate possible fluctuations in the behavior of the sensors.

The device according to the invention can also comprise any one or several of the following means:

means adapted to detect a jamming of the clamp mechanism;

means adapted to monitor the honing of the electrodes during the honing operation; and means adapted to apply the welding current in the form of impulses, each impulse being controlled individually as a function of the analysis result of the corresponding step.

Other characteristics and advantages of the present invention will appear from the following description of an embodiment of the monitoring device applied to a resistance welding device. The description is made in reference to the drawings in which:

FIG. 1 is a schematic partial view of a device enabling implementation of the method of the invention;

FIG. 2 shows schematically a monitoring device and its connections to connect it to the device of FIG. 1; and FIG. 3 shows the ends of a welding clamp with the main locations possible for sensors making it possible to obtain monitoring characteristics according to the invention.

In a resistance welding method, the metallic parts to be welded form together a stack 1 and are clamped between two electrodes 2a, 2b, to which a clamp 3, actuated by a cylinder 5, apply a clamping force F.

A source of tension represented by its terminals B1, B2, supplying a tension V(t) variable as a function of time t and measurable by means of a voltmeter 7, is connected to the electrodes 2a, 2b.

The tension V(t) is advantageously applied in the form of a series of periodic bipolar impulses having a maximal amplitude $V_0$. The application of this tension V(t) causes the apparition of a welding current having an intensity I(t) variable as a function of time t and measurable by means of an ampmeter 6. The welding current I(t) is generally in the form of impulses having a peak-to-peak amplitude $I^+$-$I^-$ correlated with the tension impulses V(t). The application of the tension V(t) is controlled by a monitoring and control device 10 by means of electrical signals sent from this device by terminals S1, S2, as a function of the input signals that the device 10 receives at least one of the input terminals represented by the terminals E1 to E6.

The monitoring method according to the present invention uses an indication on the evolution of the clamping force F before, during, and after the passage of the current I(t) to perform a first evaluation of the quality of the performed welding operation.

To this effect, the method of the invention provides more particularly for measuring before, during, and after the passage of the current, a force parameter $C_f(t)$ representative of the clamping force F, for example, the constraint to which an arm 31 of the clamp 3 is subjected. The monitoring method provides subsequently for comparing this force parameter $C_f(t)$ to a first threshold $C_{f1}$ during the passage of the current I(t).

This force parameter $C_f(t)$ evolves in the course of the different phases of the welding method.

During a first period t1, which is called "shoring phase" and during which the electrodes 2a, 2b are moved until they clamp tightly the stack 1 of parts to be welded, the parameter $C_f(t)$ evolves in an increasing and quick manner.

The clamping force F is applied with a calibrated intensity so that the force parameter $C_f(t)$ can reach or go over an appropriate shoring threshold $C_{f0}$. The cylinder 5 is controlled to this effect by signals coming through terminals B3, B4 when it is an electric cylinder, or by a flow of a control fluid passing through corresponding connections, the references B3, B4 being able to designate these connections also.

The shoring phase $t_1$ is followed by a more or less long clamping phase $t_2$, during which the force parameter $C_f(t)$ is constant. The duration of the clamping phase is determined so that the total duration of the shoring phase and the clamping phase is at least equal to a time interval that the slowest cylinder 5 would need to apply a force corresponding to the shoring threshold $C_{f0}$ to obtain a stabilized clamping.

As soon as the clamping force F is stabilized, the tension V(t) is applied between the electrodes 2a, 2b. The current I(t) then begins to heat the metallic parts of the stack 1 by Joule effect.

The current I(t) depends on the total electric resistance $R_0(t)$ offered, at a given time, by the stack 1 of parts to be welded. This total electric resistance comprises essentially a component $R_C(t)$, representative of the resistance due to the imperfect mutual contact of the parts of the stack 1, and a component $R_T(t)$ representative of the intrinsic resistance of the material constituting the parts to be welded. The component $R_T(t)$ depends on the temperature of the stack. It increases with the temperature of the parts and thus, increases as a function of time passed since the time of the first application of the tension V(t). This component decreases only after the end of the application of the tension V(t).

The reduction of the total resistance $R_0(t)$ causes an increase in the current I(t), which increases the electric energy dissipated, resulting in a sudden elevation of the temperature of the stack 1 of parts to be welded.

The time interval during which the tension V(t) is applied to the electrodes 2a, 2b, called phase of volumic expansion of the stack of metallic parts 1, is characterized by a sudden dilatation of the stack of the metallic parts which causes an increase in the clamping force F and thus also the force parameter $C_f(t)$. Commonly, the tension V(t) is cut as soon as the force parameter $C_f(t)$ has gone over a minimal threshold $C_{F1}$ higher than the threshold $C_{F0}$ corresponding to the shoring force.

The cooling which results therefrom and which characterizes a solidification phase t4, causes a retractation of the stack of metallic parts 1, causing in turn a reduction of the clamping force F and thus also a reduction of the force parameter $C_f(t)$.

At the end of the solidification phase t4, i.e., after complete solidification of the stack of welded parts 1, the clamping force is released to enable moving the electrodes 2a, 2b toward another location on the stack of parts to be welded.

According to a main characteristic, the method of the invention comprises, in addition to the steps of comparison between the measured characteristics such as the clamping force F and the force parameter $C_f(t)$ which represents it, at least one step of analysis of the clamping force F with respect to a model resulting from a preliminary learning phase.

Indeed, in accordance with the invention, the method of the invention is not limited to comparing the clamping force only to pre-established thresholds of the force signal, but it compares the evolution of the clamping force F(t) to a model evolution acquired during a preliminary learning step on stacks of metallic parts to be welded and from various mechanical, thermal, and electrical characteristics.

Thus, when a welding spot is performed at a given location of the stack of parts to be welded 1, the clamping force is measured continuously or in the form of a quick succession of individual measurements corresponding to a sampling of an analog/digital conversion. The succession of the different measurements makes it possible to deduct therefrom the evolution of the clamping force and to compare this evolution to the preliminarily recorded model. The monitoring and control device 10, thanks to its incorporated digital processing device, thus selects the evolution model that corresponds best to the measured evolution of the clamping force, and determines subsequently, on the basis of the selected model, the various subsequent welding operations.

The clamping force F, which constitutes the main characteristic on the basis of which the welding operations are controlled, is advantageously measured with a constraint gauge 4 mounted on the arm 31 of the clamp 3. FIG. 1 shows schematically the location of this gauge 4.

The gauge 4 is disposed on a front portion 311 of the bent arm 31 of the clamp 3. The other portion of the bent arm 31, the rear portion 312, extends between the front portion 311 and a hinge point 33 connecting the two arms 31, 32 of the clamp 3 in a pivotable manner. The gauge 4 is thus placed on the front portion 311, i.e., in a portion of the arm 31 which extends perpendicularly with respect to the clamping force F. Thus, the constraint force conditions the largest deformation possible of the arm 31 for a given force. Usually, the constraint gauges are glued on the arm 31 to obtain the best contact between the arm and the gauge. Instead of fixing by gluing, another form of assembly can be used, provided that the pressing forces are transmitted to the gauge. As the case may be, additional means, intended to be interposed between the sensor and the arm of the clamp, are used.

In the framework of a very rigorous monitoring of the clamping force, it is advantageous to integrate in the device for monitoring the resistance welding method means making it possible to detect a possible jamming of the mechanism of the clamp 3. Indeed, in spite of the variations of the time interval between the start of the movement of the electrodes 2a, 2b and the sending of the welding current, it is possible to determine a maximum time bearing on the whole duration of the shoring phase and of the clamping phase, at the end of which even the slowest cylinder will be able to implicate a force corresponding to the shoring threshold $C_{f0}$. When this time has passed and the clamping parameter has still not been reached, the control device 10 generates an alert signal indicating an anomaly in the performance of the welding method.

Another anomaly that can be detected in a manner analogous to the jamming of the mechanism of the clamp 3 is revealed by an inopportune reduction of the clamping force during the application of the welding tension V(t). Indeed, at the start of the phase of application of the tension V(t), the total resistance of the stack of metallic parts decreases, which causes an increase in the welding current I(t) and thus an increased dissipation of Joule energy, resulting in a sudden temperature increase of the stack of parts to be welded 1, accompanied by a volumic expansion, i.e., a sudden dilatation of the stack. This dilatation causes an increase in the clamping force R and thus also of the force parameter $C_f(t)$. Consequently, any reduction of the clamping force F or any impossibility to reach the intended threshold of the force parameter $C_f(t)$ constitutes an anomaly in the performance of the welding method.

To improve even more the quality of the analysis of the characteristics of the welding operations, the monitoring device can be complemented by additional sensors adapted to measure still other characteristics than the clamping force. Among these sensors, there can be a sensor making it possible to measure the diameter of a welding spot being performed, a sensor making it possible to detect melted material projected outside of the maximal admissible perimeter of a welding spot, or optical means making it possible to monitor the cleanliness of the surface of the stack of metallic parts on which an electrode must be placed in order to perform the next welding spot. These optical sensors can be disposed on one or the other of the arms 31, 32 of the clamp 3 or on an individual support of the clamp 3 and of its control mechanism.

It goes without saying that these optical sensors can be disposed on both sides of the stack of metallic parts to be welded in order to monitor each of the welding spots during their performance from one side as well as from the other side. FIG. 3 shows schematically the location of an optical sensor 11 in combination with a light source 12, the sensor 11 and the light source 12 being mounted on the arm 32 of the clamp 3.

As a function of the precise performance of the welding clamp 3, it can also become necessary to invert the positions of the sensor 11 and of the light source 12 with respect to the disposition shown on FIG. 3.

Advantageously, the optical sensor 11 is activated during the whole duration of the welding method and provides then a temporal signal starting from the closing of the clamp 3, through the increase in the pressing force, the passage of the welding current, the formation of the welding point, also called the forging step, and until the opening of the tool when the welding spot is formed. This temporal signal is the image of the forces or constraints within the tool. This signal continues to be analyzed continuously from the start when the electrodes 2a, 2b are positioned until when the clamp 3 is opened. For practical reasons, in particular to ensure a certain immunity from parasites, or from vibrations and other flexions of the clamp, a lower limit can be fixed to the variation of the image captured to exploit the temporal signal for the observation of the volumic expansion of the stack of metallic parts during the formation of the welding spot. From the technical point of view, the temporal signal is transmitted to inputs E1 to E6 of the monitoring and control device shown on FIG. 2. Advantageously, a differential connection of the sensor 11 is recommended.

When the sensor 11 is used to detect impurities or other foreign bodies likely to perturb the electric contact between the electrode and the surface of the stack of metallic parts on which the electrode is to be placed, other variation criteria of the image can be determined. Thus, according to the invention, the maximum of things is to be detected by the analysis of only the clamping force curve.

If optical sensors can be used to detect and/or to measure certain characteristics such as those indicated above, this is possible since some defects cause geometric variations, and thus force variations, during the welding operation, and can thus be detected very early by analysis of the force signal.

This is the case in particular with splattered spots, also called "glued" spots, which can be detected by analysis of the slopes of certain portions of the force curve.

For the verification of the wear-out of the electrodes 2a, 2b, there are essentially two technical possibilities each implicating a different type of optics. According to a first possibility, the wear-out of the electrodes can be measured by an optical sensor 13 disposed facing the tip of one of the electrodes 2a, 2b. On FIG. 3, an arbitrary location facing the electrode 2b is selected without a pretension that this represents the best location possible. This is only a representation of the principle. According to this disposition, the sensor 13 makes it possible to measure a distance d between the end of the cylindrical portion of the electrode 2b and the surface of the stack of parts 1. When this distance d goes under a predetermined threshold, the monitoring device 10 to which the sensor 13 is connected gives an alert signal indicating that the electrodes must be changed or honed.

According to another technical solution, the wear-out of the electrodes can be deducted from the variation of the welding current caused by the wear-out of the electrodes. Indeed, because of the frusto-conical shape of the tips of the electrodes, the contact surface which comes to be supported on the surface of the stack of parts 1 increases gradually as the electrodes wears out. And since the intensity of the current for a given contact surface must be constant, the increase in the contact surface is accompanied by an increase in the welding current. For the regulation of the welding current, this means that the evolution of the welding current which is expected as a function of material and geometric characteristics of the parts to be welded according to the model acquired during the learning phase, will evolve toward a higher and higher welding current as a function of the increasing wear-out of the electrodes. When a predetermined limit welding current is reached, the control device 10 generates the alert signal mentioned above which indicates that the electrodes must be changed or at least honed.

The honing of the electrodes is an operation which is done outside of the welding cycle. It consists in removing material at the tips of the electrodes when they have become blunt, to give them once again a correct profile. To this effect, the electrodes are applied with a certain initial force into a honing machine and this force is reduced gradually as the honing progresses.

Regarding the performance of the various welding operations, there are essentially two possibilities for passing the current through the parts to be welded. According to a first mode of operation, a welding tension is applied to the electrodes and a welding current is passed through the parts to be welded during a certain time, which is determined according to criteria such as the usual duration of the heating phase for a given material and metallic parts of a given thickness, or according to observations of the evolution of the welding spot.

In opposition to this continuous application, the second operation mode is an application of the welding current by impulses. In this case, the number of impulses and the duration of each of the impulses can be determined according to usual values.

However, it seems more advantageous, and this under the aspect of a desired optimization of the welding method as well as under the aspect of the best exploitation possible of the present invention, and in particular of its capacities to analyze, organize the welding step according to cycles that can be described essentially as an alternation between the sending of an impulse of welding current through the stack of parts to be welded and an analysis of the partial result obtained by means of an analysis of the evolution of the welding current or of the evolution of the information on the welding spot.

The application of the welding current in the form of impulses, according to which each impulse is controlled individually as a function of the result of analyses of the corresponding welding step, makes it possible to better monitor, and finally, to better optimize, the formation of each of the welding spots.

The signals generated by the various sensors and measurement devices, which are connected to the control device 10, can be analog signals or digital signals. In this respect, the indication of the input thermals E1 to E6 of the control device 10 shown on FIG. 2 is arbitrary, so as to let the designer of the monitoring device the task of determining the number and the nature of the inputs according to the specific needs of the application under consideration, for the implementation of the method of the invention. By the way, this is also valid, in an analogous manner, for the output terminals of the control device 10, as the outputs S1 to S4 intended to the control of the welding current and to the control of the clamping force can be performed by other outputs.

The monitoring device for implementing the method for monitoring a method for resistance welding of a stack of metallic parts clamped between two electrodes of a clamp comprises, in addition to the various sensors and measurement devices indicated and described above, also memories, at least buffer memories, for processing the signals coming from the various sensors and measurement devices, as well as back-up memories or archiving memories, depending on the volume of work to be analyzed and recorded and the duration of conservation or exploitation of the data accumulated to refine the learning phase of models of welding operations.

Further, the monitoring device also comprises, depending on the needs of the signal processing, components such as sampling means or integration means and usual means necessary for processing, exploiting, and analyzing signals.

The invention claimed is:

1. Method of monitoring resistance welding of a stack of metallic parts clamped between two electrodes of a clamp, comprising:
   applying to the electrodes, on the one hand, a clamping force, and on the other hand, an electric tension making it possible to pass a welding current through the stack of metallic parts to form each welding spot,
   measuring a force parameter representative of the clamping force before, during, and after, respectively, passage of the current,
   establishing threshold values of said clamping force,
   comparing the force parameter to at least two different threshold values to deduct therefrom an evolution of the force parameter and to control certain welding operations as a function of the evolution of said clamping force parameter,
   analyzing the clamping force measured during welding of each welding spot with respect to a model resulting from a preliminary learning phase, so as to produce an analysis result, and
   generating at least one of a correction signal and a control signal from a decision-making matrix as a function of the analysis result, so as to monitor and control the resistance welding of each welding spot based on said analysis result by using said decision-making matrix during welding of each welding spot.

2. Method according to claim 1, which comprises analyzing at least one additional characteristic with respect to a corresponding additional model resulting from an additional preliminary learning phase, said at least one additional characteristic being selected among volumic expansion of the welding spot, increase in the clamping force during a temperature increase of the welding spot, stabilization of the clamping force after a temperature increase of the welding spot, behavior of the welding current passing through the stack of metallic parts to be welded, cooling of the welding spot after the welding current passing through the stack of metallic parts has stopped, a diameter of the welding spot, detection of melted material projected outside a perimeter of the welding spot.

3. Method according to claim 1, wherein the step of analyzing the clamping force only analyzes a curve of the clamping force of the electrodes.

4. Method according to claim 1 which comprises detecting jamming of a mechanism of the clamp.

5. Method according to claim 1, which comprises monitoring honing of the electrodes during a honing operation.

6. Method according to claim 1, wherein the welding current is applied in the form of impulses, each impulse being controlled individually as a function of the analysis result.

* * * * *